United States Patent [19]
Moore

[11] Patent Number: 5,186,587
[45] Date of Patent: * Feb. 16, 1993

[54] AUTOMOTIVE BARRIER NET

[75] Inventor: Donal Moore, Northville, Mich.

[73] Assignee: Polytech Netting Industries, L.P., Canada

[*] Notice: The portion of the term of this patent subsequent to Jun. 25, 2008 has been disclaimed.

[21] Appl. No.: 824,044

[22] Filed: Jan. 23, 1992

Related U.S. Application Data

[60] Division of Ser. No. 584,467, Sep. 18, 1990, Pat. No. 5,090,856, which is a continuation-in-part of Ser. No. 469,966, Jan. 25, 1990, Pat. No. 5,026,231.

[51] Int. Cl.$^5$ ............................................. B61D 45/00
[52] U.S. Cl. .................................... 410/118; 410/129; 280/749; 180/271; 296/24.1; 296/37.1
[58] Field of Search ................ 410/96, 115, 117, 118, 410/129, 141, 145; 180/271; 280/748, 749, 751; 296/24.1, 24.2, 50, 37.1, 37.16, 180.1

[56] References Cited

U.S. PATENT DOCUMENTS

| | | | |
|---|---|---|---|
| 2,669,402 | 2/1954 | Del Mar | 410/118 |
| 2,854,931 | 10/1958 | Campbell | 410/118 |
| 2,997,331 | 8/1961 | Kudner | 296/24.1 |
| 3,044,800 | 7/1962 | Wicker | 410/129 X |
| 3,049,373 | 8/1962 | Biggers | 296/24.1 X |
| 3,169,781 | 2/1965 | Abruzzinn | 280/749 |
| 3,190,686 | 6/1965 | Smiler | |
| 3,367,707 | 2/1968 | Merriweather | 296/24.1 |
| 3,486,723 | 12/1969 | Harrison | 410/118 |
| 3,534,998 | 10/1970 | Johnson et al. | 296/24.1 |
| 3,695,698 | 10/1972 | Trump | 280/749 X |
| 4,173,369 | 11/1979 | Roggin | 296/24.1 |
| 4,213,636 | 7/1980 | King | 280/749 |
| 4,215,895 | 8/1980 | Phillips | 280/749 X |
| 4,368,902 | 1/1983 | McDowell | 296/24.1 X |
| 4,763,944 | 8/1988 | Fry et al. | 296/50 |
| 4,919,467 | 4/1990 | Guimelli | 296/24.1 |
| 5,026,231 | 6/1991 | Moore | 410/118 |
| 5,090,856 | 2/1992 | Moore | 410/118 |

FOREIGN PATENT DOCUMENTS

| | | |
|---|---|---|
| 34-19758 | 11/1985 | Fed. Rep. of Germany . |
| 3738931 | 6/1989 | Fed. Rep. of Germany . |
| 2470033 | 11/1979 | France . |
| 61-193949 | 8/1986 | Japan . |
| 2206548 | 1/1989 | United Kingdom . |

Primary Examiner—Michael S. Huppert
Assistant Examiner—James Eller
Attorney, Agent, or Firm—Basile and Hanlon

[57] ABSTRACT

A barrier set replaces the metal bulkhead between the passenger and trunk compartments of an automobile. The barrier net comprises flexible, substantially inelastic webbing. The webbing is formed of a plurality of vertical, spaced straps and a plurality of horizontal, spaced straps traversing the vertical straps. The vertical strap is secured to the horizontal strap at each point where the two straps cross. The barrier net is attached in place between the passenger and trunk compartment. A variation of the barrier net includes an enlarged aperture formed in the webbing, the webbing aperture being situated such that it coincides with a selectively open space extending between the passenger and trunk compartments, with the space being adapted to receive oversized items extending from the trunk compartment into the passenger compartment.

9 Claims, 2 Drawing Sheets

AUTOMOTIVE BARRIER NET

CROSS-REFERENCE TO RELATED APPLICATIONS

This is a division of application Ser. No. 07/584,467, filed on Sep. 18, 1990, now U.S. Pat. No. 5,090,856, which is a continuation-in-part of co-pending application Ser. No. 07/469,966 filed Jan. 25, 1990 now U.S. Pat. No. 5,026,231.

BACKGROUND OF THE INVENTION

1. Field of the Invention

The present invention relates generally to barrier nets, and more specifically to a barrier net which replaces the metal bulkhead in an automobile between the trunk and passenger compartments.

2. Description of the Relevant Art

For the past several years, automobile manufacturers have strived to make cars more fuel efficient while at the same time increasing the safety standards. One of the ways in which fuel may be conserved is to make the car lighter. Thus, alternative materials such as plastics have replaced metal in many areas of the automobile.

However, as of yet, no suitable replacement has been found for the heavy, metal bulkhead between the trunk and passenger compartments of the standard automobile. Although many lighter materials exist, these materials cannot pass safety requirements since they cannot restrain cargo in the trunk from entering the passenger compartment. The suitable replacement materials that do exist are either cost prohibitive, or they have to be much wider than the standard sheet metal used and cannot therefore fit within the space constraints for a normal bulkhead.

Thus, it would be desirable to replace the metal bulkhead with a barrier net which is lightweight, yet strong enough to meet safety standards.

SUMMARY OF THE INVENTION

The present invention solves the above-mentioned problems by providing a barrier net at a trunk forward end and suspended between a passenger compartment and a trunk compartment of an automobile. The barrier net comprises flexible, substantially inelastic webbing. The webbing comprises a plurality of vertical, spaced straps, and a plurality of horizontal, spaced straps traversing the vertical straps. Means are provided for securing the vertical strap to the horizontal strap at each point where the two straps cross. Also provided are means for attaching the barrier net to the forward end side walls.

In a second embodiment of the present invention, the barrier net comprises flexible, substantially inelastic webbing. The webbing comprises a plurality of vertical, spaced straps, and a plurality of horizontal, spaced straps traversing the vertical straps. Means are provided for securing the vertical strap to the horizontal strap at each point where the two straps cross. An enlarged aperture is formed in the webbing, with the webbing aperture situated such that it coincides with a selectively open space extending between the passenger compartment and the trunk compartment, the space being adapted to receive oversized items extending from the trunk compartment into the passenger compartment. Also provided are means for attaching the barrier net to the forward end side walls.

BRIEF DESCRIPTION OF THE DRAWINGS

Other objects and features of the invention will become apparent by reference to the following specification and to the drawings, in which.

DETAILED DESCRIPTION OF THE PREFERRED EMBODIMENTS

Figure 1:
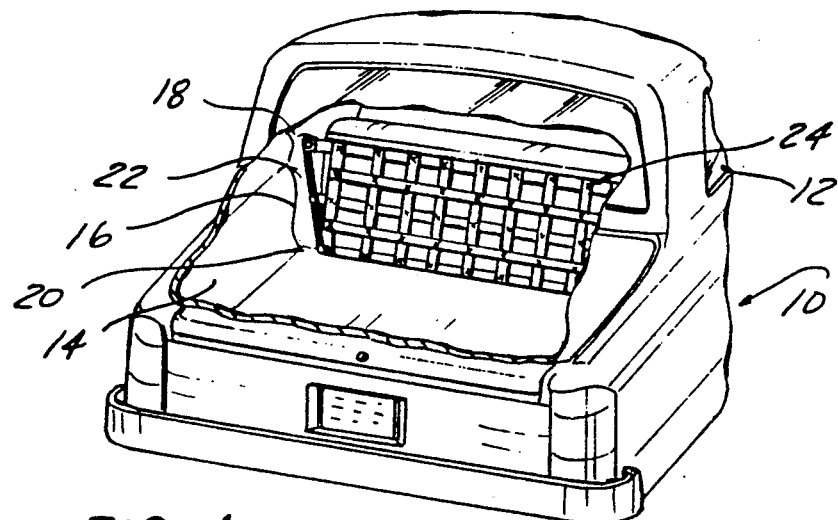
FIG. 1 is a cutaway perspective view showing the barrier net in place between the trunk and passenger compartments of an automobile.

Referring now to FIG. 1, there is shown an automobile having a car body 10 with a passenger compartment 12 and a trunk compartment 14. Trunk compartment 14 has a forward end 16. Forward end 16 has a top wall 18, a bottom wall 20, and two side walls 22 extending upwardly and outwardly from bottom wall 20. The barrier net of the present invention is designated generally as 24. Barrier net 24 is located at the trunk forward end 16 and is suspended between passenger compartment 12 and trunk compartment 14.

Figure 2:
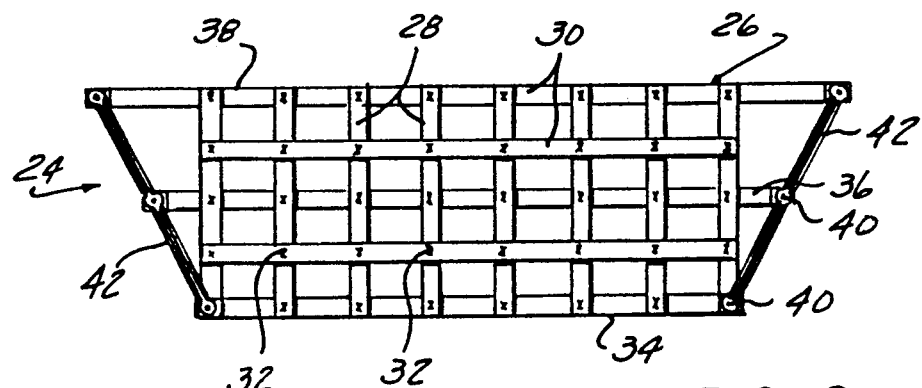
FIG. 2 is a front view of the barrier net with a mounting bracket attached to each side of the net.

Referring now to FIG. 2, barrier net 24 comprises flexible, substantially inelastic webbing 26. Webbing 26 may be made of any suitable material such as a textile material, but in the preferred embodiment, webbing 26 is made from a reinforced multi-filament polypropylene or polyester. Webbing 26 comprises a plurality of vertical, spaced straps 28. A plurality of horizontal, spaced straps 30 traverse vertical straps 28. Means are provided for securing vertical strap 28 to horizontal strap 30 at each point where the two straps cross. This securing means may be any suitable means such as stitching, riveting, or sonic welding. FIG. 2 shows stitching 32 securing the straps.

Barrier net 24 can be any shape or configuration as long as it conforms to a space defined by the top 18, bottom 20 and side walls 22 of forward end 16. In the preferred embodiment, barrier net 24 conforms to this space as shown in FIG. 2. A lower horizontal webbing strap 34 has a length less than that of a middle horizontal webbing strap 36, and the middle horizontal webbing strap length is less than that of an upper horizontal webbing strap 38. In this way, a plane containing the ends of straps 34, 36 and 38 would conform to upwardly and outwardly extending side wall 22.

Figure 3:
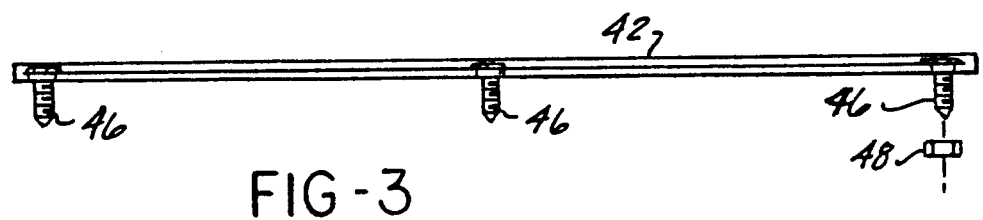
FIG. 3 is an enlarged side view of the mounting bracket with a nut shown exploded from one of the screws.
Figure 4:
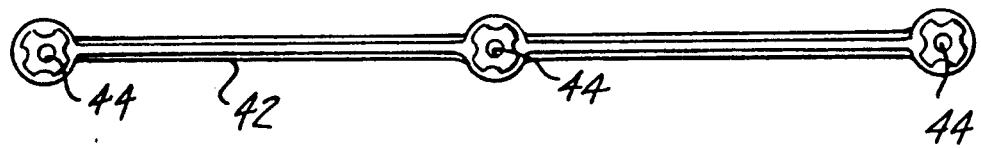
FIG. 4 is a top view of the mounting bracket.

Means are provided for attaching barrier net 24 to the forward end side walls 22. This attaching means may comprise any suitable means. In the preferred embodiment, an aperture 40 is formed in each end of each of the lower, middle and upper horizontal webbing straps, 34, 36 and 38 respectively. A mounting bracket 42, as best seen in FIGS. 3 and 4, has two ends and a middle, and an aperture 44 formed in each of the ends and the middle of bracket 42. Brackets 42 may be made of any suitable material including a sheet metal, and in the preferred embodiment, this bracket material is a rigid plastic.

The barrier net attaching means further comprises means, receivable through the bracket and webbing apertures, 44, 40 respectively, and through an aperture (not shown) in the forward end side wall 22, for attaching bracket 42 to webbing 26 and to the forward end side wall 22. This bracket attaching means may comprise any suitable means. In the preferred embodiment, this means comprises a screw 46 and nut 48.

The barrier net may also comprise a separate means for keeping barrier net 24 taut. This may be accomplished simply by fitting the webbing 26 exactly to the space requirements defined by the configuration of the forward end. Then, when net 24 is attached in place by brackets 42, the net will be taut. However, this may also be done by any conventional tensioning means.

Figure 5:
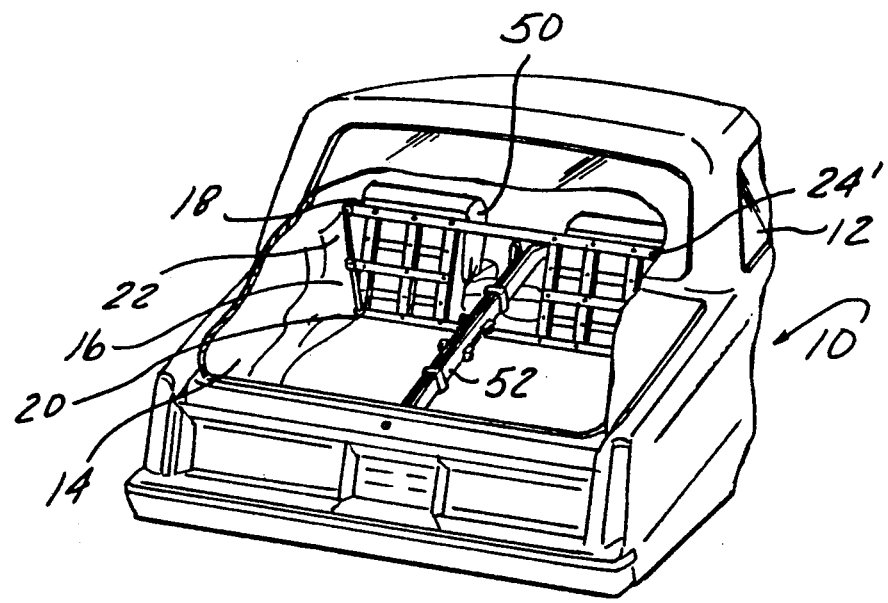
FIG. 5 is a cutaway perspective view showing the second embodiment of the barrier net in place between the trunk and passenger compartments of an automobile.
Figure 6:
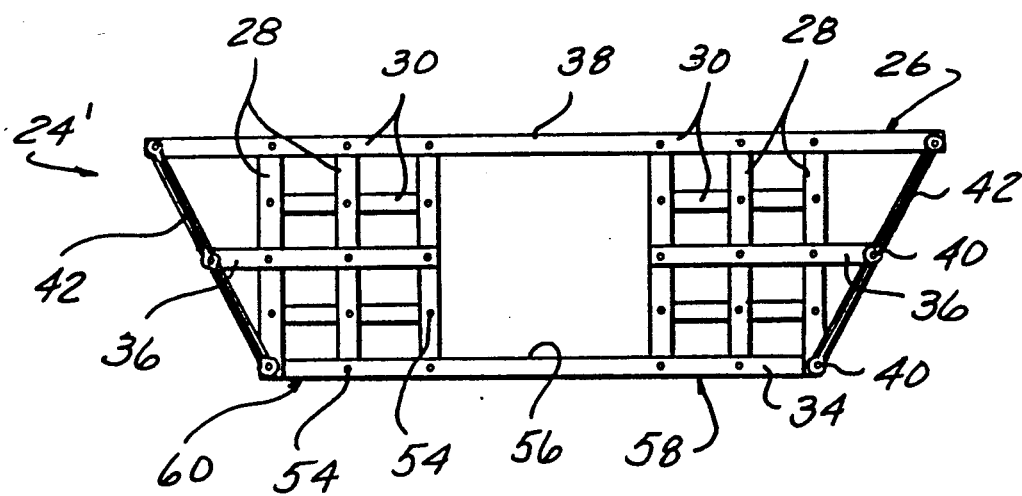
FIG. 6 is a front view of the second embodiment with a mounting bracket attached to each side of the net.

A second embodiment of the barrier net is shown in FIGS. 5 and 6, designated generally as 24'. FIG. 5 shows an automobile having a car body 10 with a passenger compartment 12 and a trunk compartment 14. A selectively open space 50 extends between the passenger compartment 12 and trunk compartment 14. Space 50 is adapted to receive oversized items extending from the trunk compartment 14 into passenger compartment 12. Examples of such oversized items could be skis 52, as depicted in FIG. 5. Open space 50 may be any size or configuration, depending upon the make or model of a particular automobile. Open space 50 can be selectively opened or closed by any conventional means, depending on the model of the car. One example of this would be as shown in FIG. 5, where a middle portion between two bucket back seats is foldable down to open the space. Other examples include the entire back seat folding down, a small door opening, or any other suitable means to open the space 50 between the trunk compartment 14 and passenger compartment 12.

Trunk compartment 14 has a forward end 16. Forward end 16 has a top wall 18, a bottom wall 20 and two side walls 22 extending upwardly and outwardly from bottom wall 20. Barrier net 24' is located at the trunk forward end 16 and is suspended between passenger compartment 12 and trunk compartment 14.

Referring now to FIG. 6, barrier net 24' comprises flexible, substantially inelastic webbing 26. Webbing 26 may be made of any suitable material such as a textile material, but as with the first embodiment, webbing 26 is preferably made from a reinforced multi-filament polypropylene or polyester. Also, as in the first embodiment, webbing 26 comprises a plurality of vertical, spaced straps 28, as well as a plurality of horizontal, spaced straps 30 traversing vertical straps 28. Means are provided for securing vertical strap 28 to horizontal strap 30 at each point where the two straps cross. This securing means may be any suitable means, such as stitching, riveting or sonic welding. FIG. 6 shows rivets 54 securing the straps.

An enlarged aperture 56 is formed in webbing 26, with the webbing aperture 56 situated such that it coincides with the space 50 between the trunk and passenger compartments, 14, 12, respectively. Enlarged aperture 56 may be formed in webbing 26 in any shape, configuration or location, as long as it coincides with space 50 when barrier net 24' is installed at the trunk compartment forward end 16. Enlarged aperture 56 may be defined between two spaced webbing sections 58, 60, as shown in FIG. 6. The preferred embodiment shows these sections 58, 60 attached on the top by upper horizontal webbing strap 38, and on the bottom by lower horizontal webbing strap 34. It is to be understood that sections 58, 60 need not be mirror images of one another, nor need they be connected to each other in any way-webbing sections 58, 60 could be totally separate and each attached separately in a conventional manner to the trunk compartment forward end 16. Aperture 56 would then comprise the space between the two sections 58, 60, after they are mounted in a particular automobile.

Barrier net 24' can be any shape or configuration as long as its outer perimeter conforms to a space defined by the top 18, bottom 20 and side walls 22 of trunk forward end 16. In the second embodiment, the configuration of barrier net 24' is preferably that shown in FIG. 6. A lower horizontal webbing strap 34 has a length less than that of an upper horizontal webbing strap 38, and a middle horizontal webbing strap 36 is divided into two sections, with one section on each side of enlarged aperture 56. In this way, a plane containing the ends of straps 34, 36 and 38 would conform to upwardly and outwardly extending side wall 22.

The means for attaching barrier net 24' to the forward end side walls 22 is as described above with the first embodiment, as are the means for keeping barrier net 24' taut.

The barrier net 24, 24' of the present invention is extremely lightweight due to the use of the aforementioned webbing materials and the plurality of spaces formed by using horizontal and vertical straps. The webbing is also strong enough to restrain a hundred pounds of cargo in the trunk area from entering the passenger compartment under crash test conditions decelerating from 20 mph to a sudden stop of 0 mph. Barrier net 24 thus saves cost and weight on a vehicle while safely restraining cargo in the trunk area.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. In an automobile having a car body with a passenger compartment and a trunk compartment, the trunk compartment having a forward end with a top wall, a bottom wall, and two side walls extending upwardly and outwardly from the bottom wall, the improvement comprising:
   a barrier net at the trunk forward end and suspended between the passenger compartment and the trunk compartment, the barrier net comprising:
   flexible, substantially inelastic webbing, the webbing comprising:
   a plurality of vertical, spaced straps;
   a plurality of horizontal, spaced straps traversing the vertical straps;
   wherein the webbing has a top, bottom and two sides which conform to a space defined by the forward end's top, bottom and side walls; and
   securing means for securing the vertical strap to the horizontal strap at each point where the two straps cross; and
   barrier net attaching means for attaching the barrier net to the forward end side walls, wherein the barrier net attaching means comprises;

at least two apertures formed in each side of the webbing;

two brackets, each bracket having corresponding apertures formed therein;

bracket attaching means, receivable through the respective bracket and webbing apertures and through corresponding apertures in the forward end side wall, for attaching the brackets to the webbing and to the forward end side wall.

2. The barrier net as defined in claim 1 wherein the securing means comprises stitching.

3. The barrier net as defined in claim 1 wherein the securing means comprises rivets.

4. The barrier net as defined in claim 1 wherein the securing means comprises sonic welding.

5. The barrier net as defined in claim 1 wherein the webbing is made from a reinforced multi-filament polypropylene.

6. The barrier net as defined in claim 1 wherein the barrier net attaching means further comprises means for keeping the barrier net taut.

7. The barrier net as defined in claim 1 wherein the brackets are formed of a plastic.

8. The barrier net as defined in claim 1 wherein the brackets are formed of a metal.

9. The barrier net as defined in claim 1 wherein the bracket attaching means comprises a nut and a screw.

* * * * *